US006732514B2

(12) United States Patent
Zhong

(10) Patent No.: US 6,732,514 B2
(45) Date of Patent: May 11, 2004

(54) HYDRAULIC JACK WITH DUAL PUMP SYSTEM

(76) Inventor: Xue Zheng Zhong, Unit 5B, 135E. Chestnut Ave., Monrovia, CA (US) 91016

( * ) Notice: Subject to any disclaimer, the term of this patent is extended or adjusted under 35 U.S.C. 154(b) by 0 days.

(21) Appl. No.: 10/263,237

(22) Filed: Oct. 3, 2002

(65) Prior Publication Data

US 2004/0065082 A1 Apr. 8, 2004

(51) Int. Cl.[7] .......... F16D 31/02

(52) U.S. Cl. .......... 60/479; 60/486; 254/93 H

(58) Field of Search .......... 60/477, 479, 486; 254/89 H, 93 H

(56) References Cited

U.S. PATENT DOCUMENTS 2,337,831 A * 12/1943 McGovern .......... 60/479
2,659,307 A * 11/1953 Framhein .......... 60/479
3,307,482 A * 3/1967 Lauck .......... 60/477
5,975,496 A * 11/1999 Hong et al. .......... 60/486
6,530,219 B1 * 3/2003 Yeh .......... 60/477
6,572,080 B1 * 6/2003 Delikatzis .......... 254/93 H

* cited by examiner

*Primary Examiner*—Thomas E. Lazo
(74) *Attorney, Agent, or Firm*—Raymond Y. Chan; David and Raymond Patent Group

(57) ABSTRACT

A hydraulic jack with dual pump system includes two fluid reservoirs, two pumps for pumping the hydraulic fluid from the fluid reservoirs to an inner fluid chamber of a hydraulic cylinder respectively, and two sequence valves each opening at a predetermined control pressure to enable the hydraulic fluid flowing from the inner fluid chamber back to the respective fluid reservoir, wherein the control pressure preset at the first sequence valve is smaller than that preset at the second sequence valve. Therefore, at a no load condition, the pumps are pumping the hydraulic fluid to the inner fluid chamber to speed up the lifting up of the lifting arm, and at a load condition, the first sequence valve is opened by means of a loading pressure while the second pumping means keeps pumping the hydraulic fluid to the inner fluid chamber to substantially lift up the lifting arm.

20 Claims, 6 Drawing Sheets

HYDRAULIC JACK WITH DUAL PUMP SYSTEM

BACKGROUND OF THE PRESENT INVENTION

1. Field of Invention

The present invention relates to a jack, and more particularly to a hydraulic jack with dual pump system, which can quickly lift up a drive piston to raise a load while being energy effective.

2. Description of Related Arts

A conventional hydraulic jack comprises a lifting arm movably disposed in a base, a handle mounted on the base, and a hydraulic system which comprises a fluid cylinder for receiving a hydraulic fluid and a piston connected to the lifting arm in such a manner that when the handle is pulled and pushed repeatedly to pump the hydraulic fluid to drive the piston upwardly, the lifting arm is lifted upwardly for raising a load thereon.

Accordingly, the handle is repeatedly operated in a no load condition or in a light load condition to raise the lifting arm by the piston in a very slow speed. For example, when the lifting arm is lifted up approximately 50 to 60 centimeters from an original storage position to an initial lift up position, the handle must be required to pull and push about twenty times. In other words, even though there is no load on the lifting arm, the lifting operation requires the same speed as normal. Therefore, the lifting operation is time and labor consuming such that the load cannot be immediately raised, especially in an emergency situation, by the lifting arm in response to the handle.

An improved hydraulic jack is capable of speeding up the lifting operating in the no load condition. For example, U.S. Pat. No. 5,755,099, owned by Hung, generally suggests a hydraulic jack comprising a hydraulic cylinder having a hollow piston rod to form an inner oil chamber wherein an oil guide tube is slidably inserted into the piston rod to guide the hydraulic fluid flowing into the inner oil chamber. The second oil channel is extending between the pump oil chamber and the inner oil chamber of the piston wherein the second check valve is located in the second oil channel to allow hydraulic flow from the pump oil chamber into the inner oil chamber of the piston rod when the plunger is moved into the pump oil chamber. The third check valve is located in the third oil channel to allow hydraulic flow from the outer reservoir into the inner chamber and to prevent flow in the opposite direction. The fourth oil channel is extending between the inner chamber and the second oil channel ahead of the second check valve. The sequence valve is opening at the predetermined control pressure to enable hydraulic flow from the second oil channel into the inner chamber.

When operating the hydraulic jack, the hydraulic fluid is not only pumped into an inner chamber of the hydraulic cylinder to push the piston rod at the back thereof forwardly but also filled into the inner oil chamber to apply an additional pushing force against the piston rod. Therefore, in the no load condition, the lifting arm is capable of being lifted up quickly. However, such hydraulic jack has several drawbacks.

Since the hollow shaped piston rod is constructed to have the inner oil chamber therein, the stiffness structure of the piston rod will be substantially weakened. The main purpose of the piston rod is to pull the lifting arm upwardly so as to lift up the load having at least hundreds lbs. Due to the safety reason, it is unreasonable for a use to use the weak but quick loading hydraulic jack because any mistake may cause an unwanted injury to the user, especially in an emergency situation. Furthermore, an O-shaped sealing ring must be mounted on the oil guide tube to provide an air sealed condition between the oil guide tube and the piston rod so as to prevent the hydraulic fluid from leaking at the inner oil channel. However, the sealing ring will be torn out after a period of time. Once the sealing ring is broken, the hydraulic fluid will be leaked from the inner oil chamber. In other words, the hydraulic jack cannot provide the quick lifting feature and is dangerous for the user.

Moreover, the structural design of the piston rod can provide a quick lifting operation of the lifting arm. It means that the lifting arm will be dropped down quickly when the hydraulic fluid is returned back to the container since the hydraulic fluid is quickly flow back to the container from the inner oil chamber of the piston rod. In addition, if one of the check valves is broken, the entire hydraulic jack cannot be operated. It is unsafe that when the user accidentally releases the hydraulic fluid from the hydraulic cylinder. Due to the gravity, the downward force of the weight of the load will accelerate the downward movement of the lifting arm. It is dangerous when the user cannot respond immediately to stop the dropping down of the load.

SUMMARY OF THE PRESENT INVENTION

A main object of the present invention is to provide a hydraulic jack with dual pump system, which can quickly lift up a drive piston to raise a load while being energy effective.

Another object of the present invention is to provide a hydraulic jack with dual pump system which can double up the hydraulic fluid flowing to push the pusher piston forward so as to speed up the lifting operation of the hydraulic jack in no load or light load condition.

Another object of the present invention is to provide a hydraulic jack with dual pump system, wherein the pusher piston is constructed to have a solid member so as to enhance the stiffness of the pusher piston.

Another object of the present invention is to provide a hydraulic jack with dual pump system, wherein the dual pump system allows the hydraulic fluid flowing back to the hydraulic fluid tank slowly, so that the lifting arm of the hydraulic jack is slowly dropped down while the unloading operation, so as to prevent the lifting arm suddenly dropping drown to cause an injury of the user.

Another object of the present invention is to provide a hydraulic jack with dual pump system, wherein the hydraulic cylinder is constructed to be encircled by the first fluid reservoir where the hydraulic fluid is stored therein, so as to substantially not only protect the hydraulic cylinder by the first fluid reservoir but only reduce a size of the hydraulic jack in comparison with the conventional hydraulic jack that the hydraulic fluid tank is mounted at a position behind the piston shank.

Accordingly, in order to accomplish the above objects, the present invention provides a hydraulic jack, comprising:

a base frame;

a lifting arm having a pivot end pivotally mounted on the base frame and a lifting end arranged in such a manner that when the pivot end of the lifting arm is moved forwardly, the lifting end of the lifting arm is driven to move upwardly;

a hydraulic cylinder, having an inner fluid chamber, mounted on the base frame;

a piston shank having a driving portion movably disposed in the fluid chamber and a pusher head solidly extended from the driving portion towards the lifting arm to push the pivot end of the lifting arm forward;

a first fluid pump system comprising a first fluid reservoir for storing a hydraulic fluid therein and a first fluid circuit comprising a first fluid passing channel extending between the first fluid reservoir and the inner fluid chamber of the hydraulic cylinder, a first pumping means for pumping the hydraulic fluid from the first fluid reservoir to the inner fluid chamber, a first check valve located at the first fluid passing channel for preventing a flow of hydraulic fluid in a reverse direction, a first fluid returning channel extending between the first fluid reservoir to the inner fluid chamber, and a first sequence valve located at the first fluid returning channel and opening at a predetermined control pressure to enable the hydraulic fluid flowing from the inner fluid chamber back to the first fluid reservoir;

a second fluid pump system comprising a second fluid reservoir communicatively connected with the first fluid reservoir and a second fluid circuit comprising a second fluid passing channel extending between the second fluid reservoir and the inner fluid chamber of the hydraulic cylinder, a second pumping means for pumping the hydraulic fluid from the second fluid reservoir to the inner fluid chamber, a second check valve located at the second fluid passing channel for preventing a flow of hydraulic fluid in a reverse direction, a second fluid returning channel extending between the second fluid reservoir to the inner fluid chamber, and a second sequence valve located at the second fluid returning channel and opening at a predetermined control pressure to enable the hydraulic fluid flowing from the inner fluid chamber back to the second fluid reservoir, wherein the control pressure preset at the first sequence valve is smaller than that preset at the second sequence valve; and an actuation handle pivotally connected to the base frame and arranged to drive the lifting arm from a no load condition to a load condition, wherein at the no load condition, both the first and second pumping means are respectively pumping the hydraulic fluid from the first and second fluid reservoirs to the inner fluid chamber of the hydraulic cylinder to push the driving portion of the piston shank forward, so as to speed up the lifting up of the lifting arm, and at the load condition, the first sequence valve is opened for allowing the hydraulic fluid flowing back from the inner fluid chamber to the first fluid reservoir by means of a loading pressure, while the second pumping means keeps pumping the hydraulic fluid to the inner fluid chamber to substantially lift up the lifting arm.

DETAILED DESCRIPTION OF THE PREFERRED EMBODIMENT

Figure 1:
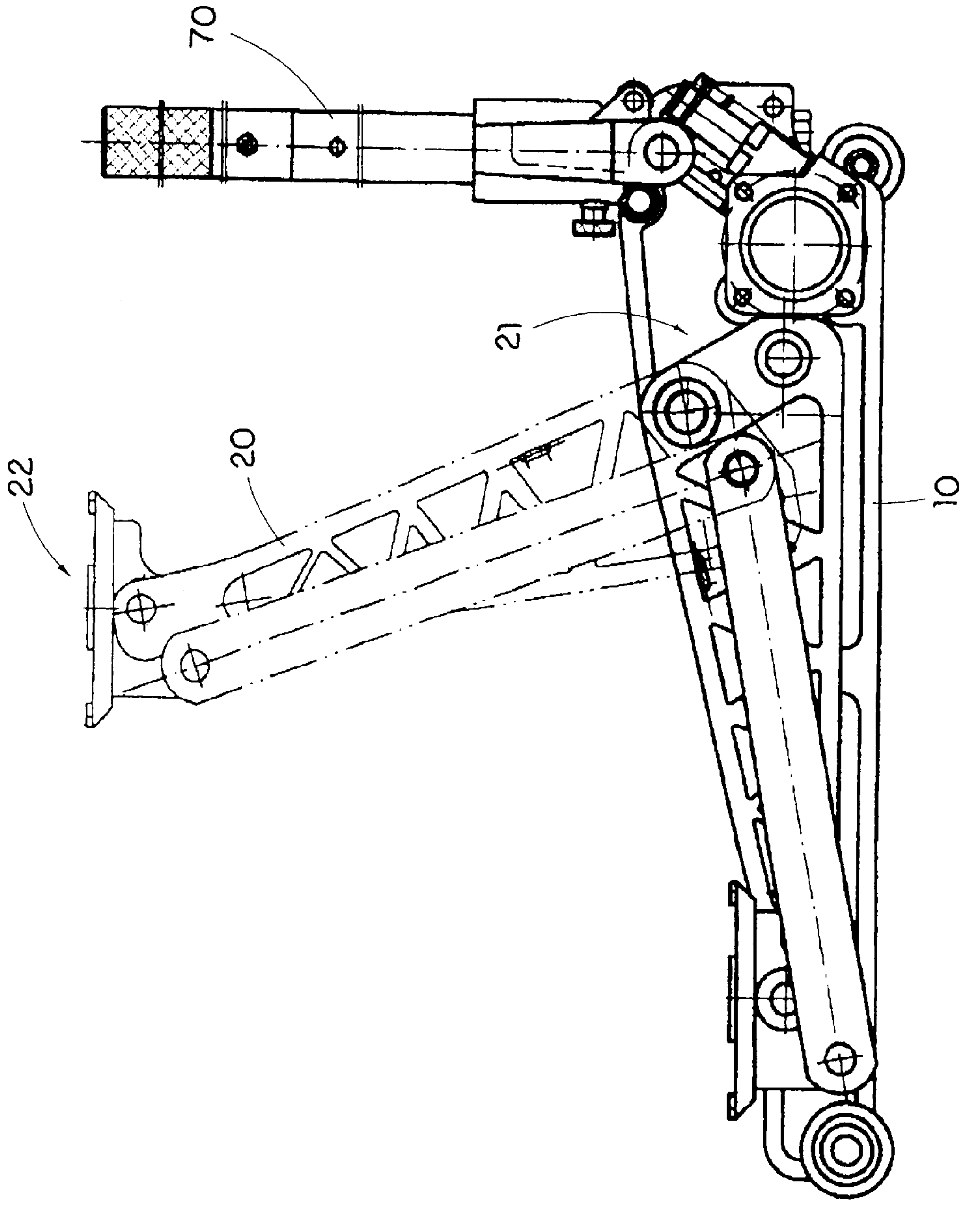
FIG. 1 is a side view of a hydraulic jack with dual pump system according to a preferred embodiment of the present invention.
Figure 2:
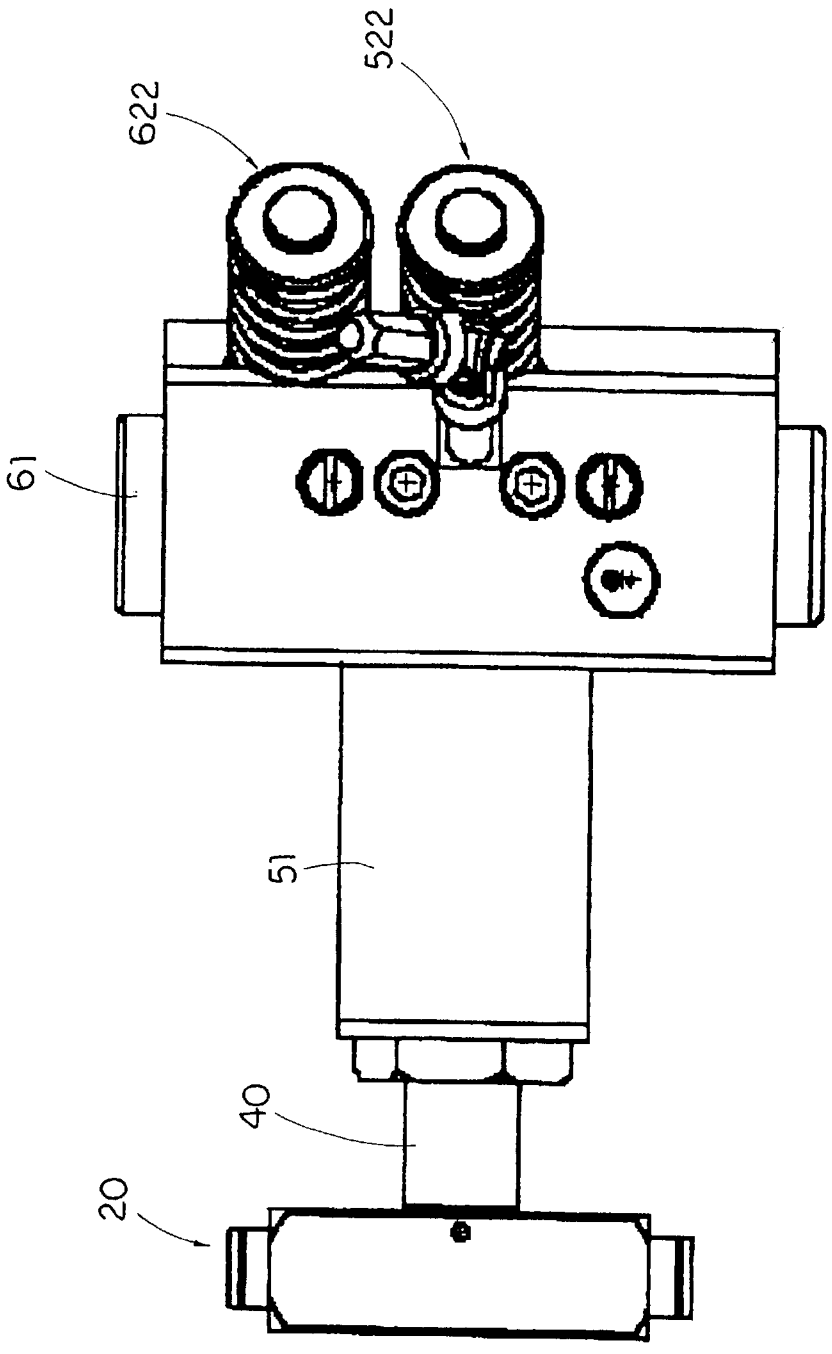
FIG. 2 is a partially perspective view of the hydraulic jack with dual pump system according to the above preferred embodiment of the present invention.
Figure 3:
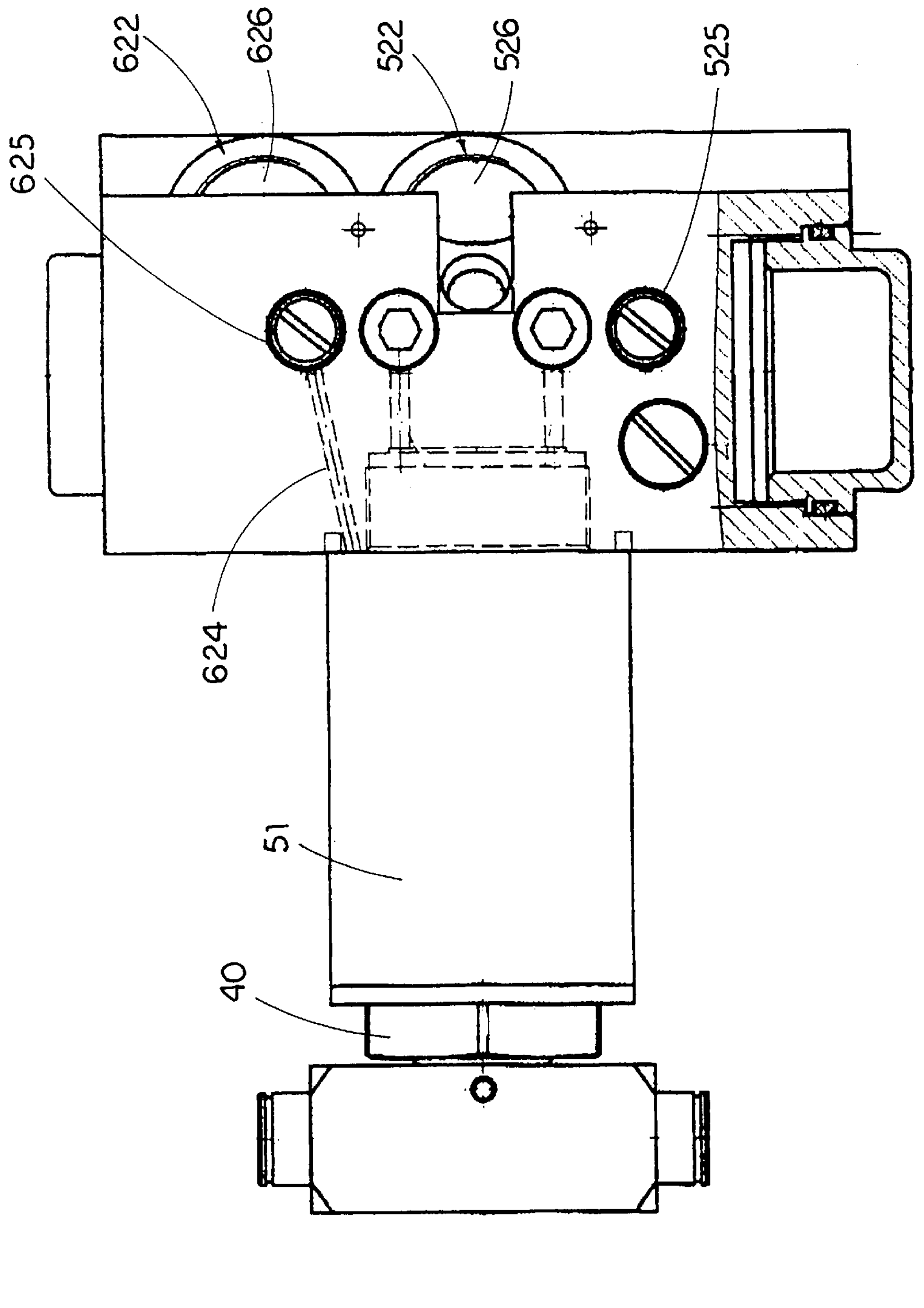
FIG. 3 is a top view of the hydraulic jack with dual pump system according to the above preferred embodiment of the present invention.

Referring to FIGS. 1 through 6 of the drawings, a hydraulic jack according to a preferred embodiment of the present invention is illustrated, wherein the hydraulic jack comprises a base frame 10 and a lifting arm 20 having a pivot end 21 pivotally mounted on the base frame 10 and a lifting end 22 arranged in such a manner that when the pivot end 21 of the lifting arm 20 is moved forwardly, the lifting end 22 of the lifting arm 20 is driven to move upwardly.

The hydraulic jack further comprises a hydraulic cylinder 30, having an inner fluid chamber 31, mounted on the base frame 10, and a piston shank 40 having a driving portion 41 movably disposed in the fluid chamber 31 and a pusher head 42 solidly extended from the driving portion 41 towards the lifting arm 20 to push the pivot end 21 of the lifting arm 20 forward.

The hydraulic jack further comprises a first fluid pump system 50, a second fluid pump system 60, and an actuation handle 70.

The first fluid pump system 50 comprises a first fluid reservoir 51 for storing a hydraulic fluid therein and a first fluid circuit 52 comprising a first fluid passing channel 521 extending between the first fluid reservoir 51 and the inner fluid chamber 31 of the hydraulic cylinder 30, a first pumping means 522 for pumping the hydraulic fluid from the first fluid reservoir 51 to the inner fluid chamber 31, a first check valve 523 located at the first fluid passing channel 521 for preventing a flow of hydraulic fluid in a reverse direction, a first fluid returning channel 524 extending between the first fluid reservoir 51 to the inner fluid chamber 31, and a first sequence valve 525 located at the first fluid returning channel 524 and opening at a predetermined control pressure to enable the hydraulic fluid flowing from the inner fluid chamber 31 back to the first fluid reservoir 51.

The second fluid pump system 60 comprises a second fluid reservoir 61 communicatively connected with the first fluid reservoir 51 and a second fluid circuit 62 comprising a second fluid passing channel 621 extending between the second fluid reservoir 61 and the inner fluid chamber 31 of the hydraulic cylinder 30, a second pumping means 622 for pumping the hydraulic fluid from the second fluid reservoir 61 to the inner fluid chamber 31, a second check valve 623 located at the second fluid passing channel 621 for preventing a flow of hydraulic fluid in a reverse direction, a second fluid returning channel 624 extending between the second fluid reservoir 61 to the inner fluid chamber 31, and a second sequence valve 625 located at the second fluid returning channel 624 and opening at a predetermined control pressure to enable the hydraulic fluid flowing from the inner fluid chamber 31 back to the second fluid reservoir 61, wherein the control pressure preset at the first sequence valve 525 is smaller than that preset at the second sequence valve 625.

The actuation handle 70 is pivotally connected to the base frame 10 and is arranged to drive the lifting arm 20 from a no load condition to a load condition, wherein at the no load condition, both the first and second pumping means 522, 622 are respectively pumping the hydraulic fluid from the first and second fluid reservoirs 51, 61 to the inner fluid chamber 31 of the hydraulic cylinder 30 to push the driving portion 41 of the piston shank 40 forward, so as to speed up the lifting up of the lifting arm 20, and at the load condition, the first sequence valve 525 is opened for allowing the hydraulic fluid flowing back from the inner fluid chamber 31 to the first fluid reservoir 51 by means of a loading pressure, while the second pumping means 622 keeps pumping the hydraulic fluid to the inner fluid chamber 31 to substantially lift up the lifting arm 20.

Figure 4:
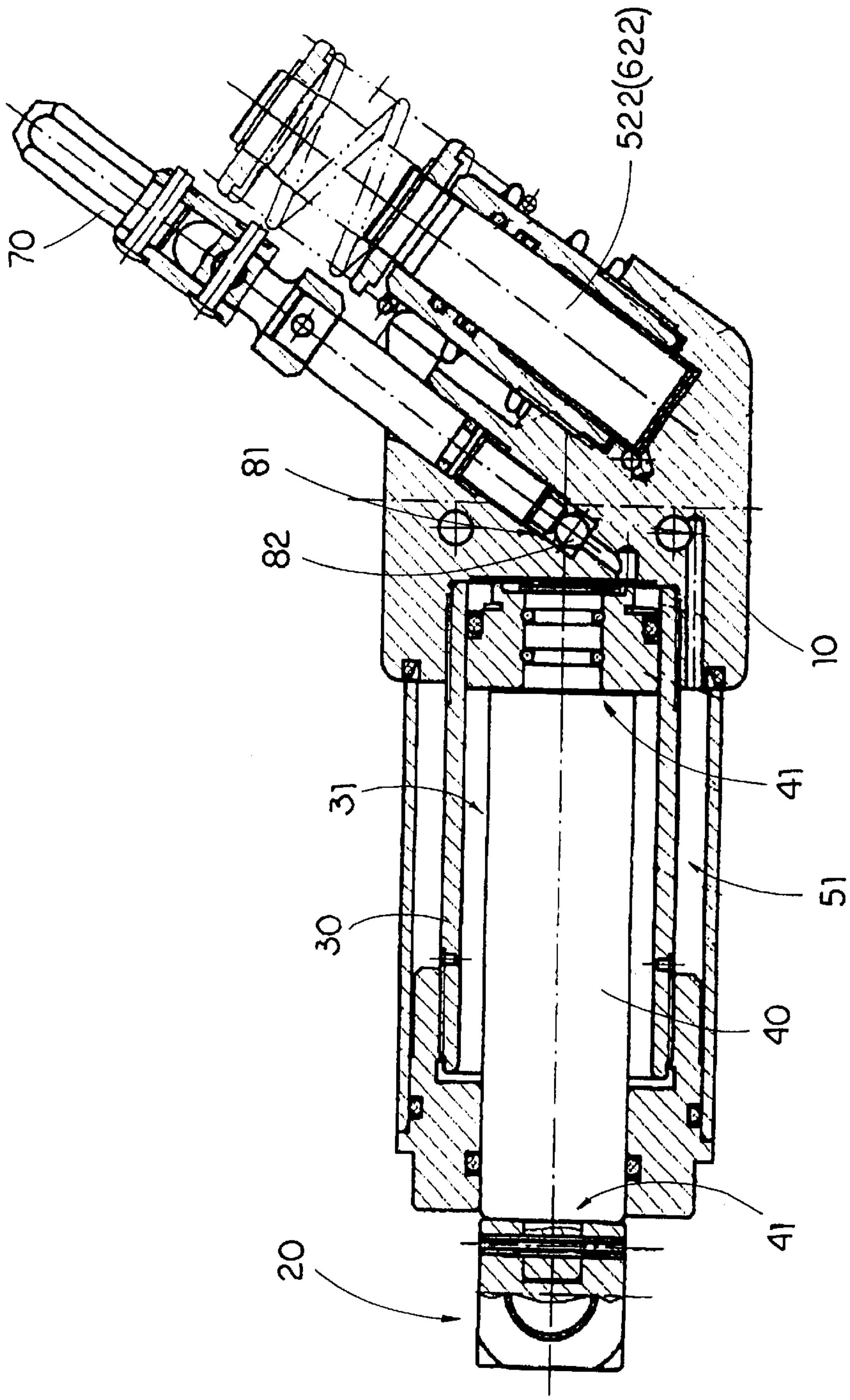
FIG. 4 is a side sectional view of the hydraulic jack with dual pump system according to the above preferred embodiment of the present invention.
Figure 5:
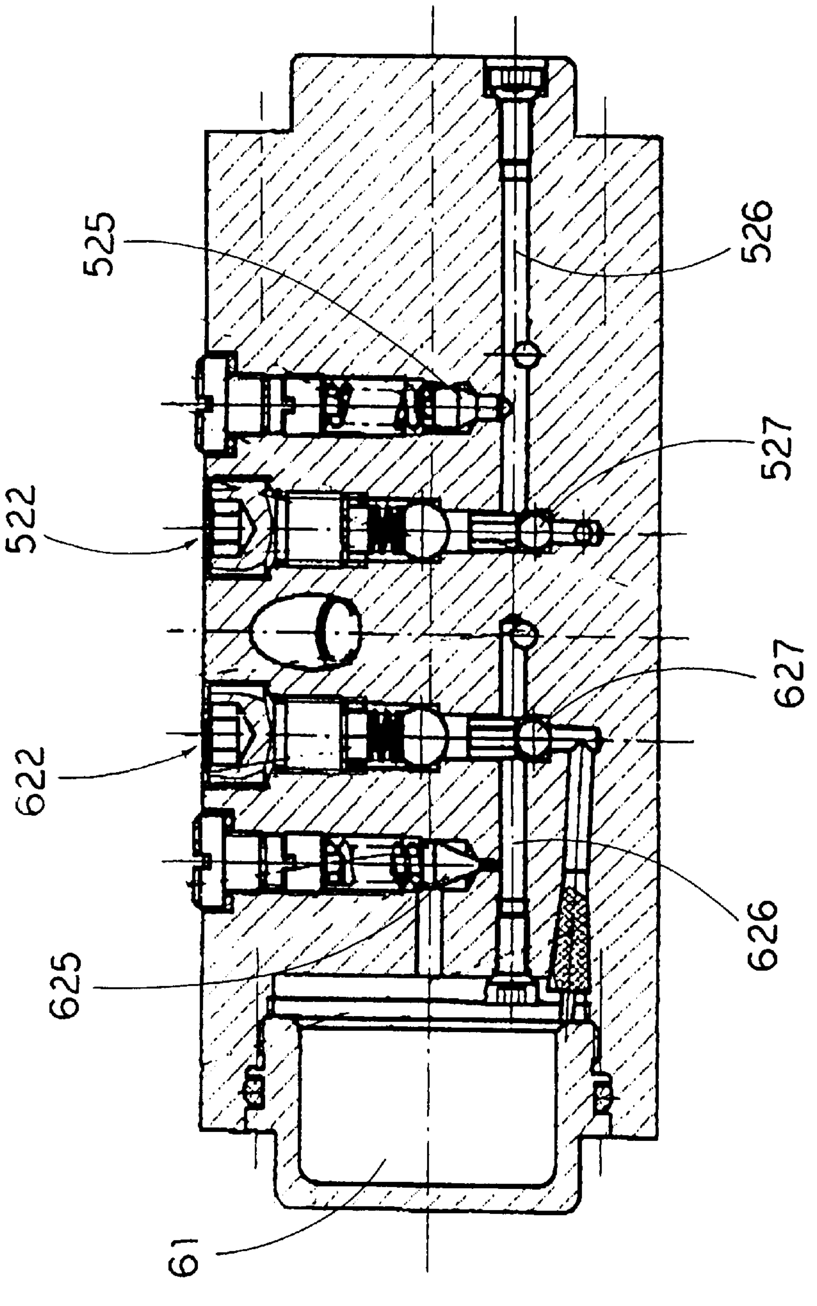
FIG. 5 is rear sectional view of the hydraulic jack with dual pump system according to the above preferred embodiment of the present invention.
Figure 6:
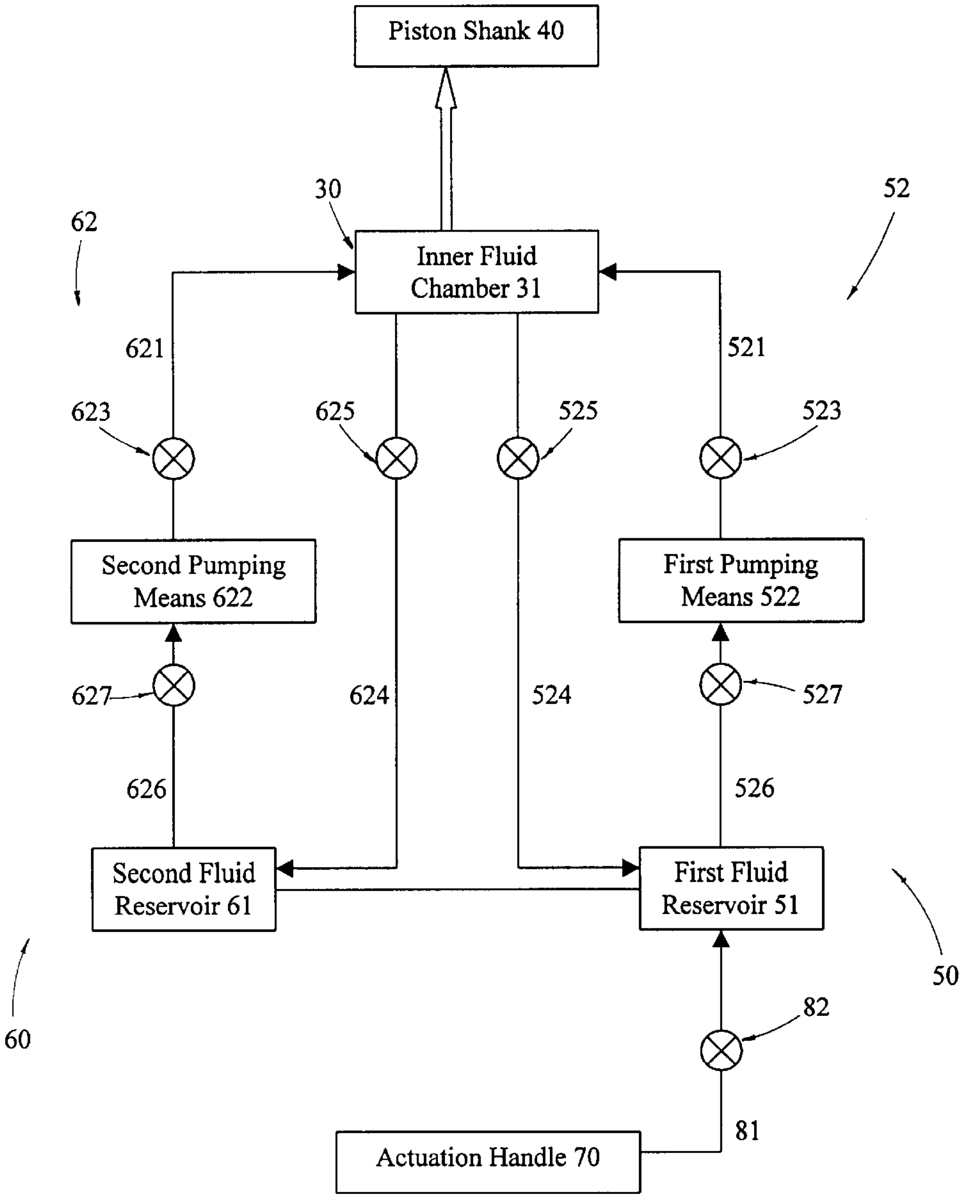
FIG. 6 is a block diagram of the hydraulic jack with dual pump system according to the above preferred embodiment of the present invention.

According to the preferred embodiment, the first fluid reservoir 51, having a hollow shaped, is supported on the base frame 10 wherein the hydraulic cylinder 30 is coaxially disposed within the first fluid reservoir 51 so as to protect the hydraulic cylinder 30 and the piston shank 40, as shown in FIG. 4. In addition, the hydraulic jack can be substantially reduced its size.

The first fluid circuit 52 further comprises a first guiding channel 526, which is embodied as a part of the first fluid passing channel 521, extending between the first fluid reservoir 51 and the first pumping means 522 and a first safety valve 527 located at the first guiding channel 526 for preventing a flow of the hydraulic fluid in a reverse direction.

The first pumping means 522 is embodied as a conventional fluid pump and comprises a first fluid cavity and a first plunger movable into and out of the first fluid cavity in such a manner that when the first plunger is moved out of the first fluid cavity, the hydraulic fluid is pumped from the first fluid reservoir 51 to the first fluid cavity through the first guiding channel 526, and when the first plunger is moved into the first fluid cavity, the hydraulic fluid within the first fluid cavity is pumped to the inner fluid chamber 31 of the hydraulic cylinder 30.

The second fluid circuit 62 further comprises a second guiding channel 626, which is embodied as a part of the second fluid passing channel 621, extending between the second fluid reservoir 61 and the second pumping means 622 and a second safety valve 627 located at the first guiding channel 626 for preventing a flow of the hydraulic fluid in a reverse direction.

The second pumping means 622 is embodied as a conventional fluid pump and comprises a second fluid cavity and a second plunger movable into and out of the second fluid cavity in such a manner that when the second plunger is moved out of the second fluid cavity, the hydraulic fluid is pumped from the second fluid reservoir 61 to the second fluid cavity through second first guiding channel 626, and when the second plunger is moved into the second fluid cavity, the hydraulic fluid within second first fluid cavity is pumped to the inner fluid chamber 31 of the hydraulic cylinder 30.

Accordingly, a cross sectional area of the first plunger of the first pumping means 522 is larger than that of the second plunger of the second pumping means 622 in such a manner that a volume of the hydraulic fluid pumped to the inner fluid chamber 31 via the first pumping means 522 is larger than a volume of the hydraulic fluid pumped to the inner fluid chamber 31 via the second pumping means 622. In other words, when the first and second pumping means 522, 622 are pumping the hydraulic fluid to the inner fluid chamber 31 simultaneously, a speed of the hydraulic fluid via the first pumping means 522 is faster than a speed of the hydraulic fluid via the second pumping means 622. Therefore, when the lifting arm 20 is in the no load condition, the first and second pumping means 522, 622, especially the first pumping means 522, are pumping the hydraulic fluid to the inner fluid chamber 31 so as to quickly and effectively lift up the lifting end 22 of the lifting arm 20.

Since force is direct proportional to area when the pressure is constant, the first plunger having a smaller cross sectional can substantially reduce the pivotal force applied on the actuation handle 70 to pump the hydraulic fluid to the inner fluid chamber 31 for lifting up the lifting end 21 of the lifting arm 20 at the load condition. In other words, the user is able to save his or her energy to pivotal move the actuation handle 70 during the lifting process.

According to the preferred embodiment, a predetermined control pressure is set for each of the first and second sequence valves 525, 625, wherein when the loading pressure of the load object applied on the lifting end 22 of the lifting arm 20 exceeds the control pressure preset at each of the first and second sequence valves 525, 625, the corresponding first and second sequence valves 525, 625 are arranged to be opened for allowing the hydraulic fluid flowing back to the first and second fluid reservoirs 51, 61 through the first and second returning channels 524, 624 respectively.

It is worth to mention that the control pressure preset at the first sequence valve 525 is smaller than the control pressure preset at the second sequence valve 625 such that at the no load condition or a light load condition, the first and second sequence valves 525, 625 are closed to prevent the hydraulic fluid flowing back to the first and second fluid reservoirs 51, 61 respectively.

However, when the hydraulic jack is in the load condition, i.e. the loading pressure is greater than the control pressure of the first sequence valve 525 and smaller than the control pressure of the second sequence valve 625, the first sequence valve 525 is opened to enable the hydraulic fluid flow back to the first fluid reservoir 51 and to stop the first pumping means 525 to stop pumping the hydraulic fluid from the first fluid reservoir 51 to the inner fluid chamber 31 while the second sequence valve 625 is remained in the closed position, so as to retain the hydraulic fluid in the inner fluid chamber pumping from the second fluid reservoir 61.

The hydraulic jack further comprises a fluid return channel 81 extended from the first fluid reservoir 51 to rotatably connect with the actuation handle 70 and a fluid return valve 82 located at the fluid return channel 81 and arranged to be closed when the actuation handle 70 is tightly connected to the fluid return channel 81, so as to retain a pressure of the hydraulic fluid in the first fluid reservoir 51. Accordingly, a pressure in the first fluid reservoir 51 can be released through the fluid return channel 81 when the actuation handle 70 is detached therefrom, so as to balance the pressure inside the first fluid reservoir 51 with outside.

In order to operate the hydraulic jack of the present invention, the user must rotatably connect the actuation handle 70 to the fluid return channel 81 so as to close the fluid return valve 82. Then, the user is able to apply a pivotal force on the actuation handle 70 to drive the actuation handle upwardly and downwardly so as to move the first and second plungers of the first and second pumping means 522, 622 until the first and second fluid cavities thereof in a vacuum condition. Therefore, the first and second pumping means 522, 622 will start to pump the hydraulic fluid from the first and second fluid reservoirs 51, 61 to the inner fluid chamber 31 respectively. Since the first and second pumping means 522, 622 are simultaneously pumping the hydraulic fluid into the fluid chamber 31, a greater pushing force is applied on the driving portion 41 of the piston shank 40 to push the lifting end 21 of the lifting arm 20 upwardly. In other words, at the no load condition, the lifting end 21 of the lifting arm 20 can be quickly lifted up via the first and second fluid pump systems 50, 60.

When the lifting end 21 of the lifting arm 20 reaches the load object, the downward loading pressure of the load object is exerted on the lifting end 21 of the lifting arm 20. Once the loading pressure is greater than the control pressure of the first sequence valve 525, the first sequence valve 525 is automatically opened for enabling the hydraulic fluid flowing back to the first fluid reservoir 51 to balance the pressure between the first fluid reservoir 51 and the inner fluid chamber 31. However, since the loading pressure is smaller than the control pressure of the second sequence valve 625, the second sequence valve 625 is remained at the closed position, so that the second pumping means 622 keeps pumping the hydraulic fluid into the inner fluid chamber 31 to continuously lift up the lifting end 21 of the lifting arm 20.

In order to drop down the lifting end 21 of the lifting arm 20, the user is able to open the fluid return valve 82 via the actuation handle 70 so that the pressure inside the first fluid reservoir 51 is released. Therefore, the hydraulic fluid inside the inner fluid chamber 31 is slowly returned back to the first fluid reservoir 51, so as to release the pushing force on the driving portion 41 of the piston shank 40 and to gradually drop down the lifting end 21 of the lifting arm 20.

What is claimed is:

1. A hydraulic jack, comprising:

a base frame;

a lifting arm having a pivot end pivotally mounted on said base frame and a lifting end arranged in such a manner that when said pivot end of said lifting arm is moved forwardly, said lifting end of said lifting arm is driven to move upwardly;

a hydraulic cylinder, having an inner fluid chamber, mounted on said base frame;

a piston shank having a driving portion movably disposed in said fluid chamber and a pusher head solidly extended from said driving portion towards said lifting arm to push said pivot end of said lifting arm forward;

a first fluid pump system comprising a first fluid reservoir for storing a hydraulic fluid therein and a first fluid circuit comprising a first fluid passing channel extending between said first fluid reservoir and said inner fluid chamber of said hydraulic cylinder, a first pumping means for pumping said hydraulic fluid from said first fluid reservoir to said inner fluid chamber, a first check valve located at said first fluid passing channel for preventing a flow of said hydraulic fluid in a reverse direction, a first fluid returning channel extending between said first fluid reservoir to said inner fluid chamber, and a first sequence valve located at said first fluid returning channel and opening at a predetermined control pressure to enable said hydraulic fluid flowing from said inner fluid chamber back to said first fluid reservoir;

a second fluid pump system comprising a second fluid reservoir communicatively connected with said first fluid reservoir and a second fluid circuit comprising a second fluid passing channel extending between said second fluid reservoir and said inner fluid chamber of said hydraulic cylinder, a second pumping means for pumping said hydraulic fluid from said second fluid reservoir to said inner fluid chamber, a second check valve located at said second fluid passing channel for preventing a flow of said hydraulic fluid in a reverse direction, a second fluid returning channel extending between said second fluid reservoir to said inner fluid chamber, and a second sequence valve located at said second fluid returning channel and opening at a predetermined control pressure to enable said hydraulic fluid flowing from said inner fluid chamber back to said second fluid reservoir, wherein said control pressure preset at said first sequence valve is smaller than that preset at said second sequence valve; and an actuation handle pivotally connected to said base frame and arranged to drive said lifting arm from a no load condition to a load condition, wherein at said no load condition, both said first and second pumping means are respectively pumping said hydraulic fluid from said first and second fluid reservoirs to said inner fluid chamber of said hydraulic cylinder to push said driving portion of said piston shank forward, so as to speed up said lifting up of said lifting arm, and at said load condition, said first sequence valve is opened for allowing said hydraulic fluid flowing back from said inner fluid chamber to said first fluid reservoir by means of a loading pressure, while said second pumping means keeps pumping said hydraulic fluid to said inner fluid chamber to substantially lift up said lifting end of said lifting arm.

2. A hydraulic jack, as recited in claim 1, wherein said control pressure preset at said first sequence valve is lower than said loading pressure applied on said lifting end of said lifting arm.

3. A hydraulic jack, as recited in claim 2, wherein a speed of said hydraulic fluid pumping from said first fluid reservoir to said inner fluid chamber via said first pumping means is faster than a speed of said hydraulic fluid pumping from said second fluid reservoir to said inner fluid via said second pumping means when said first and second pumping means are pumping said hydraulic fluid simultaneously at said no load condition.

4. A hydraulic jack, as recited in claim 3, wherein said first pumping means comprises a first fluid cavity and a first plunger movable into and out of the first fluid cavity for pumping said hydraulic fluid from said first fluid cavity to said inner fluid chamber, and wherein said second pumping means comprises a fluid cavity and a second plunger movable into and out of the said fluid cavity for pumping said hydraulic fluid from said second fluid cavity to said inner fluid chamber, wherein said first plunger has a cross sectional area is larger than a cross sectional area of said second plunger.

5. A hydraulic jack, as recited in claim 4, wherein said first fluid circuit further comprises a first guiding channel extending between said first fluid reservoir and said first pumping means and a first safety valve located at said first guiding channel for preventing a flow of said hydraulic fluid in a reverse direction, and wherein said fluid circuit further comprises a said guiding channel extending between said first fluid reservoir and said first pumping means and a first safety valve located at said first guiding channel for preventing a flow of said hydraulic fluid in a reverse direction.

6. A hydraulic jack, as recited in claim 5, further comprising a fluid return channel extended from said first fluid reservoir to rotatably connect with said actuation handle and a fluid return valve located at said fluid return channel and arranged to be closed when said actuation handle is tightly connected to said fluid return channel, so as to retain a pressure of said hydraulic fluid in said first fluid reservoir.

7. A hydraulic jack, as recited in claim 6, wherein said first fluid reservoir, having a hollow shaped, is supported on said base frame wherein said hydraulic cylinder is coaxially disposed within said first fluid reservoir.

8. A hydraulic jack, as recited in claim 5, wherein said first fluid reservoir, having a hollow shaped, is supported on said base frame wherein said hydraulic cylinder is coaxially disposed within said first fluid reservoir.

9. A hydraulic jack, as recited in claim 4, further comprising a fluid return channel extended from said first fluid reservoir to rotatably connect with said actuation handle and a fluid return valve located at said fluid return channel and arranged to be closed when said actuation handle is tightly connected to said fluid return channel, so as to retain a pressure of said hydraulic fluid in said first fluid reservoir.

10. A hydraulic jack, as recited in claim 4, wherein said first fluid reservoir, having a hollow shaped, is supported on said base frame wherein said hydraulic cylinder is coaxially disposed within said first fluid reservoir.

11. A hydraulic jack, as recited in claim 3, wherein said first fluid circuit further comprises a first guiding channel extending between said first fluid reservoir and said first pumping means and a first safety valve located at said first guiding channel for preventing a flow of said hydraulic fluid in a reverse direction, and wherein said fluid circuit further comprises a said guiding channel extending between said first fluid reservoir and said first pumping means and a first safety valve located at said first guiding channel for preventing a flow of said hydraulic fluid in a reverse direction.

12. A hydraulic jack, as recited in claim 3, further comprising a fluid return channel extended from said first fluid reservoir to rotatably connect with said actuation handle and a fluid return valve located at said fluid return channel and arranged to be closed when said actuation handle is tightly connected to said fluid return channel, so as to retain a pressure of said hydraulic fluid in said first fluid reservoir.

13. A hydraulic jack, as recited in claim 3, wherein said first fluid reservoir, having a hollow shaped, is supported on said base frame wherein said hydraulic cylinder is coaxially disposed within said first fluid reservoir.

14. A hydraulic jack, as recited in claim 2, wherein said first pumping means comprises a first fluid cavity and a first plunger movable into and out of the first fluid cavity for pumping said hydraulic fluid from said first fluid cavity to said inner fluid chamber, and wherein said second pumping means comprises a fluid cavity and a second plunger movable into and out of the said fluid cavity for pumping said hydraulic fluid from said second fluid cavity to said inner fluid chamber, wherein said first plunger has a cross sectional area is larger than a cross sectional area of said second plunger.

15. A hydraulic jack, as recited in claim 2, wherein said first fluid circuit further comprises a first guiding channel extending between said first fluid reservoir and said first pumping means and a first safety valve located at said first guiding channel for preventing a flow of said hydraulic fluid in a reverse direction, and wherein said fluid circuit further comprises a said guiding channel extending between said first fluid reservoir and said first pumping means and a first safety valve located at said first guiding channel for preventing a flow of said hydraulic fluid in a reverse direction.

16. A hydraulic jack, as recited in claim 1, wherein a speed of said hydraulic fluid pumping from said first fluid reservoir to said inner fluid chamber via said first pumping means is faster than a speed of said hydraulic fluid pumping from said second fluid reservoir to said inner fluid via said second pumping means when said first and second pumping means are pumping said hydraulic fluid simultaneously at said no load condition.

17. A hydraulic jack, as recited in claim 16, wherein said first pumping means comprises a first fluid cavity and a first plunger movable into and out of the first fluid cavity for pumping said hydraulic fluid from said first fluid cavity to said inner fluid chamber, and wherein said second pumping means comprises a fluid cavity and a second plunger movable into and out of the said fluid cavity for pumping said hydraulic fluid from said second fluid cavity to said inner fluid chamber, wherein said first plunger has a cross sectional area is larger than a cross sectional area of said second plunger.

18. A hydraulic jack, as recited in claim 1, wherein said first pumping means comprises a first fluid cavity and a first plunger movable into and out of the first fluid cavity for pumping said hydraulic fluid from said first fluid cavity to said inner fluid chamber, and wherein said second pumping means comprises a second fluid cavity and a second plunger movable into and out of the said fluid cavity for pumping said hydraulic fluid from said second fluid cavity to said inner fluid chamber, wherein said first plunger has a cross sectional area is larger than a cross sectional area of said second plunger.

19. A hydraulic jack, as recited in claim 1, wherein said first fluid circuit further comprises a first guiding channel extending between said first fluid reservoir and said first pumping means and a first safety valve located at said first guiding channel for preventing a flow of said hydraulic fluid in a reverse direction, and wherein said fluid circuit further comprises a said guiding channel extending between said first fluid reservoir and said first pumping means and a first safety valve located at said first guiding channel for preventing a flow of said hydraulic fluid in a reverse direction.

20. A hydraulic jack, as recited in claim 1, further comprising a fluid return channel extended from said first fluid reservoir to rotatably connect with said actuation handle and a fluid return valve located at said fluid return channel and arranged to be closed when said actuation handle is tightly connected to said fluid return channel, so as to retain a pressure of said hydraulic fluid in said first fluid reservoir.

* * * * *